(12) United States Patent
Motomura et al.

(10) Patent No.: US 7,535,486 B2
(45) Date of Patent: May 19, 2009

(54) DISPLAY CONTROL DEVICE, DISPLAY CONTROL METHOD, PROGRAM, AND PORTABLE APPARATUS

(75) Inventors: Hideto Motomura, Nara (JP); Hiroyoshi Komobuchi, Kyoto (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 350 days.

(21) Appl. No.: 11/526,680

(22) Filed: Sep. 26, 2006

(65) Prior Publication Data

US 2007/0019000 A1    Jan. 25, 2007

Related U.S. Application Data

(63) Continuation of application No. PCT/JP2005/009180, filed on May 19, 2005.

(30) Foreign Application Priority Data

Jun. 4, 2004    (JP) .............................. 2004-167242

(51) Int. Cl.
*H04N 7/18* (2006.01)

(52) U.S. Cl. ..................... 348/158; 348/159; 348/142; 348/143

(58) Field of Classification Search ......... 348/142–160; 375/240.01, 240.21–240.25
See application file for complete search history.

(56) References Cited

U.S. PATENT DOCUMENTS

| | | | |
|---|---|---|---|
| 6,084,594 A | | 7/2000 | Goto |
| 6,415,043 B1 | | 7/2002 | Josefsson |
| 7,057,620 B2 * | | 6/2006 | Aleksic et al. ............... 345/522 |
| 7,110,666 B2 * | | 9/2006 | Abe et al. ..................... 396/59 |
| 7,126,626 B2 * | | 10/2006 | Sawahara et al. ........ 348/14.02 |
| 2005/0212757 A1 * | | 9/2005 | Marvit et al. ............... 345/156 |
| 2006/0044396 A1 | | 3/2006 | Miyashita et al. |

FOREIGN PATENT DOCUMENTS

| | | |
|---|---|---|
| JP | 5-137049 | 6/1993 |
| JP | 11-18025 | 1/1999 |
| JP | 2000-230806 | 8/2000 |
| JP | 2000-259856 | 9/2000 |
| JP | 2001-508210 | 6/2001 |

(Continued)

*Primary Examiner*—Andy S Rao
(74) *Attorney, Agent, or Firm*—Wenderoth, Lind & Ponack, L.L.P.

(57) ABSTRACT

The present invention provides a display control method and a display control device capable of detecting a position and an orientation of an apparatus by a simple structure and controlling a display of a displayed image based on the detected position and orientation of the apparatus with ease. Two cameras are mounted on the apparatus. A user holds the apparatus in the hand, captures, by a first camera, a first image including the face of the user, and captures, by a second camera, a second image including a scene opposite to the user. A display control unit extracts features of the face from the first image and extracts scene feature points from the second image. Then, the display control unit compares the extracted results with reference graphics and the like, and calculates a user-to-apparatus distance ro and angles $\theta_o$, $\phi_o$ which indicate a direction to the apparatus, and controls the display of the displayed image based on the calculated distance ro and angles $\theta_o$, $\phi_o$.

8 Claims, 11 Drawing Sheets

FOREIGN PATENT DOCUMENTS

| | | |
|---|---|---|
| JP | 2001-356875 | 12/2001 |
| JP | 2002-7027 | 1/2002 |
| JP | 2002-164990 | 6/2002 |
| JP | 2002-323956 | 11/2002 |
| JP | 2002-366271 | 12/2002 |
| JP | 2002-366272 | 12/2002 |
| JP | 2004-21870 | 1/2004 |
| JP | 2004-120514 | 4/2004 |
| JP | 2004-147046 | 5/2004 |
| JP | 2004-312194 | 11/2004 |
| WO | 2004/039065 | 5/2004 |

* cited by examiner

DISPLAY CONTROL DEVICE, DISPLAY CONTROL METHOD, PROGRAM, AND PORTABLE APPARATUS

CROSS REFERENCE TO RELATED APPLICATION

This is a continuation application of PCT application No. PCT/JP2005/009180 filed May 19, 2005, designating the United States of America.

BACKGROUND OF THE INVENTION (1) Field of the Invention

The present invention relates to a display control method using image measurement and image recognition, and particularly to a technology which detects a position and an orientation of an apparatus on which a camera is mounted, using an image captured by the camera, and controls a display based on the detected position and orientation of the apparatus.

(2) Description of the Related Art

In recent years, with the wide use of the Internet, the so-called ubiquitous network society is being formed, in which computers and household electrical appliances are interconnected and remote control, media fusion and the like are realized. The society is characterized in having a high degree of flexibility which enables users to perform communications at any time and any place, and the users can act without recognizing differences in apparatuses and the physical distance between the user and an apparatus. Although in the realization of the ubiquitous network society, the network connection is an essential condition for the system, a high degree of flexibility in the user interface between the user and the apparatus is also a prerequisite. Even when an apparatus is connected as either hardware or software, unless the user who uses the system can freely communicate with the system, it is hard to say being ubiquitous. To this end, the technology which enhances ease in using a system, in other words, the technology which enhances usability of the system is required.

In order to realize an intuitive operation method for enhancing the usability of a system, it is necessary for the system to automatically understand the intention of the user. For the realization, for example, a technology which detects positions and orientations of interface devices is useful.

One of such interface devices is a pointing marker. For example, in FIG. 1 of Japanese Laid-Open Patent Application No. 2001-356875 (referred to as Patent Reference 1), a user holds, in a hand as a pointing marker, an object (blue LED and the like) with brightness or color which is different from that of the user. A position of the pointing marker is detected by an image sensor in a system, and in accordance with the detected position, a displayed image can be operated by the system. With this, the user can perform communications with the system intuitively with bodily sensation, without understanding the operation method of the system.

In addition, using brightness of a subject and color difference between the subject and an image of the subject, there exists a method of extracting a marker from a captured image (for example, refer to FIG. 1 of Japanese Laid-Open Patent Application No. 2000-230806 which is referred to as Patent Reference 2 hereinafter). The method is that a current marker position is compared to a reference marker position captured in advance so as to detect a distance between the subject and the image sensor. With the method, the user has only to register the reference marker by executing predetermined initial processing in activating the system. Then, the system detects changes in the position of the marker which are sequentially captured, and automatically obtains the distance between the subject and the image sensor.

In addition, the system, referred to as the virtual reality system, which gives the user sensation as if the user directly operated a real object enables the user to directly control, without recognizing the apparatus, objects in virtual space which has been built using computer graphics. For example, when a portable display which the user holds in the hand is moved three-dimensionally, the system detects the motion by an acceleration sensor and the like, and changes the displayed image to another image according to the motion (for example, refer to FIG. 11 of Japanese Patent Laid-Open Application No. 11-18025 which is referred to as Patent Reference 3 hereinafter). Thus, it is possible to intuitively provide the system with information regarding changes in viewpoints in the virtual reality space by changes in the position and orientation of the display held in the hand.

However, the technology described in Patent Reference 1 requires preparation of a special marker. Thus, there exists a problem in that the general versatility lacks and situations where the technology is used are limited. In other words, as the brightness of a subject and color difference between the subject and an image of the subject are used for detecting the marker, it is necessary to provide a marker with the brightest color among colors of any other subjects and a color which is not included in any other subjects.

In addition, with the technology described in Patent Reference 2, a single image sensor tracks plural markers and detects a distance between a subject and the image sensor. However, even with the technology, it is not possible to detect a three-dimensional position of the image sensor. In other words, as the distance from the center of a sphere to any points on the sphere is all equal, such position information is regarded as the same. Thus, there remains a problem in the usability.

On the other hand, as the acceleration sensor or the like is used in the technology of Patent Reference 3, there is no need to capture the marker. Thus, it outperforms other system configurations in terms of the general versatility. However, for example, as the acceleration sensor can not detect a speed of uniform motion, there exists a problem in terms of sensitivity of the sensor. To overcome this point, sensor fusion is effective which multi-directionally detects position/orientation information by a magnetometric sensor, a ultrasonic sensor or the like so as to complement the information each other. However, an additional sensor leads to increase in the cost of the system and increase in the capacity and weight of an apparatus. In addition, in many cases, such sensors constantly operate, and increase in the number of sensors leads to increase in electric power consumption of the apparatus. In particular, this poses a serious problem to portable apparatuses.

Thus, the present invention has been conceived in view of the aforementioned circumstances, and the object is to provide a display control method and a display control device which can detect a position and an orientation of an apparatus by a simple structure and control a display of a displayed image based on the detected position and orientation of the apparatus.

SUMMARY OF THE INVENTION

In order to achieve the aforementioned objects, the display control method according to the present invention is a display control method for controlling a display of a displayed image based on a position of an apparatus provided with a first camera and a second camera which are in a known geometric relationship, and the display control method includes: capturing, by the first camera, a first image including an object with a known image feature; capturing, by the second camera, a second image including a scene in the vicinity of the object; extracting the image feature of the object from the first image; calculating a distance from the object to the apparatus and a direction of the apparatus viewed from the object, by comparing the extracted image feature of the object to the known image feature of the object; extracting an image feature of the second image from the second image; calculating a distance from the object to the apparatus and a direction of the apparatus viewed from the object, by comparing the extracted image feature of the second image to an image feature extracted from a past image which has been captured by the second camera; and controlling the display of the displayed image based on the distance and direction calculated based on the first image and the distance and direction calculated based on the second image.

According to the present invention, as a position and an orientation of an apparatus can be detected by images captured by two cameras, increase in the capacity and weight of the apparatus required for detection can be prevented, and a display of a displayed image can be easily controlled. In addition, the electric power consumption can be reduced.

Further Information About Technical Background to this Application

The disclosure of Japanese Patent Application No. 2004-167242 filed on Jun. 4, 2004 including specification, drawings and claims is incorporated herein by reference in its entirety.

The disclosure of PCT application No. PCT/JP2005/009180 filed, May 19, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT

Figure 1:
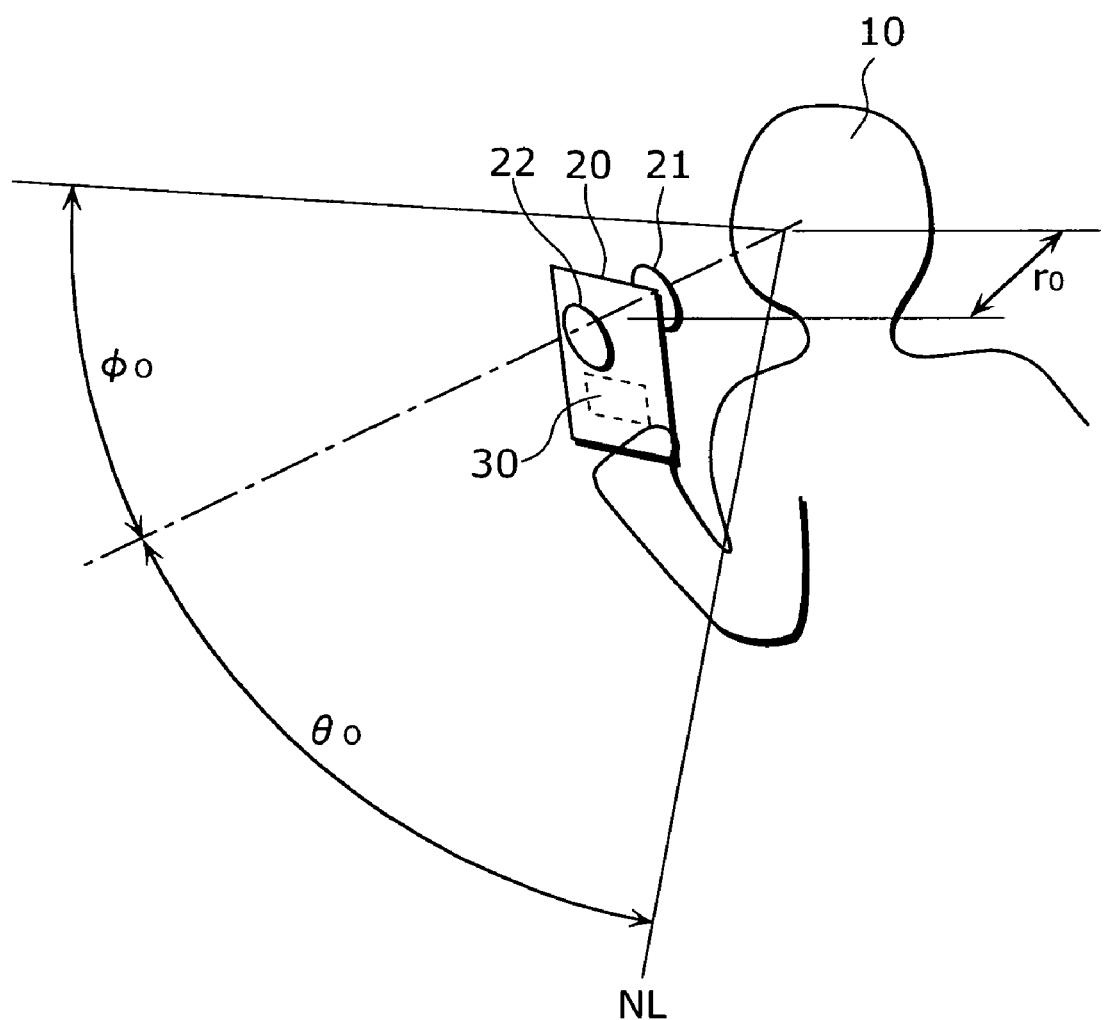
FIG. 1 is a diagram showing a state of executing a display control method according to the embodiment of the present invention.

The display control method according to the present invention is a display control method for controlling a display of a displayed image based on a position of an apparatus provided with a first camera and a second camera which are in a known geometric relationship, and the display control method includes: capturing, by the first camera, a first image including an object with a known image feature; capturing, by the second camera, a second image including a scene in the vicinity of the object; extracting the image feature of the object from the first image; calculating a distance from the object to the apparatus and a direction of the apparatus viewed from the object, by comparing the extracted image feature of the object to the known image feature of the object; extracting an image feature of the second image from the second image; calculating a distance from the object to the apparatus and a direction of the apparatus viewed from the object, by comparing the extracted image feature of the second image to an image feature extracted from a past image which has been captured by the second camera; and controlling the display of the displayed image based on the distance and direction calculated based on the first image and the distance and direction calculated based on the second image.

With this, the distance from the object to the apparatus is calculated from the first image which has been captured by the first camera and includes the known image feature of the object, and in addition, the direction of the apparatus which is viewed from the object is calculated from the second image captured by the second camera. In other words, the distance and direction of the corresponding apparatus with respect to the object, in other words, the three-dimensional position of the apparatus can be detected by the images captured by the two cameras. Then, based on this three-dimensional position of the apparatus, it is possible to easily control the display of the displayed image.

Here, it is preferable that the object is a face of a user who uses the apparatus. With this, the three-dimensional position of the apparatus with respect to the position of the face of the user is calculated when the user just holds the apparatus in the hand, captures his/her face by the first camera, and captures the scene in the vicinity of the apparatus by the second camera.

In addition, when the direction of the apparatus is calculated, the direction of the apparatus may be calculated by comparing, to an image feature extracted from a past image which has been captured by the second camera, an image feature of the second image extracted from the second image. In addition, when the direction of the apparatus is calculated, the direction of the apparatus may be calculated by comparing, to a known image feature of the object, an image feature of the object extracted from the first image.

In addition, the display control method further includes calculating an orientation of the apparatus with respect to the object using at least one of the image feature of the object extracted from the first image and the image feature of the second image extracted from the second image, wherein controlling the display of the displayed image includes controlling the display of the displayed image based on the calculated distance from the object to the apparatus, the calculated direction of the apparatus, and the calculated orientation of the apparatus. With this, it is possible to easily control the display of the displayed image in accordance with not only the three-dimensional position of the apparatus but also the orientation of the apparatus.

Note that the present invention can not only realize as such a display control method, but also as a display control device having the characteristic steps included in the display control method as units, and as a program which causes a computer to execute such steps. In addition, it is obvious that such program can be distributed via a recording medium, such as a CD-ROM and via a transmission medium, such as the Internet.

The embodiment of the present invention is described hereinafter with reference to the diagrams.

FIG. 1 is a diagram showing a state of executing a display control method according to the embodiment of the present invention. In FIG. 1, a cellular phone 20 as an apparatus of the present invention mounts a user-side camera 21 which captures an image of the user side as a first camera and an opposite-side camera 22 which captures an image opposite to the user as a second camera, which are in a known geometric relationship. Furthermore, in the diagram, an interactive display system is realized which changes a displayed image to another image in accordance with a position and an orientation of the cellular phone 20.

A user 10 holds the cellular phone 20 in the hand, and views an image on the screen (the illustration is omitted). Among the two cameras 21 and 22 which are mounted on the cellular phone 20, the user-side camera 21 captures the face of the user 10 as an object in which the image features are known. On the other hand, the opposite-side camera 22 shares an optical axis with the user-side camera 21, and captures an image which is opposite to the user. Therefore, the user 10 is not within the photographic angle of the opposite-side camera 22, and the opposite-side camera 22 captures a scene opposite to the user 10. In addition, a position/orientation detection unit 30 is mounted inside the cellular phone 20 as a position detection device, and this position/orientation detection circuit 30 detects the position and orientation of the cellular phone 20 which are determined by the motion of the hand of the user 10. On a screen, an image in accordance with the position and orientation of the cellular phone 20 is displayed, and the user 10 can freely select a desired image by moving the cellular phone 20.

As a cellular phone has originally limitations in size of a display unit (a display) because of its portability, there is an upper limit in the size of the image to be displayed. Thus, in the case where an image or a picture which is widely circulated for television and a computer is displayed on a display of a cellular phone, there exists a problem of viewability in that the details are hard to read. To improve the viewability, the image has only to be enlarged with a center focus on a specified point. Here, when the image enlargement is executed intuitively by changing the position or orientation of the cellular phone instead of pushing a button of the cellular phone or rotating a dial of the cellular phone, the convenience is improved. In addition, after confirming the details, in the case where the whole image again needs to be viewed, when the size or a clipped area of the displayed image can be directly changed in accordance with the position and orientation of the cellular phone, the user has the advantage over the operability. The image change function in the interactive display system can be applied to various cases, such as a change in a shadow of lighting which illuminates a subject or in an orientation of the displayed subject, regardless of enlargement and reduction of the image. This significantly contributes to progress in expressiveness, reality, viewability and the like of images.

As shown in FIG. 1, the position of the cellular phone 20 is represented by a rotating coordinate system in which a point between the both eyes of the user 10 is designated as the rotation center. A distance from the rotation center to the cellular phone 20 is indicated by ro, a rotation angle horizontal to a position coordinate normal line NL is indicated by θo, and a rotation angle vertical to the position coordinate normal line NL is indicated by φo.

Figure 2:
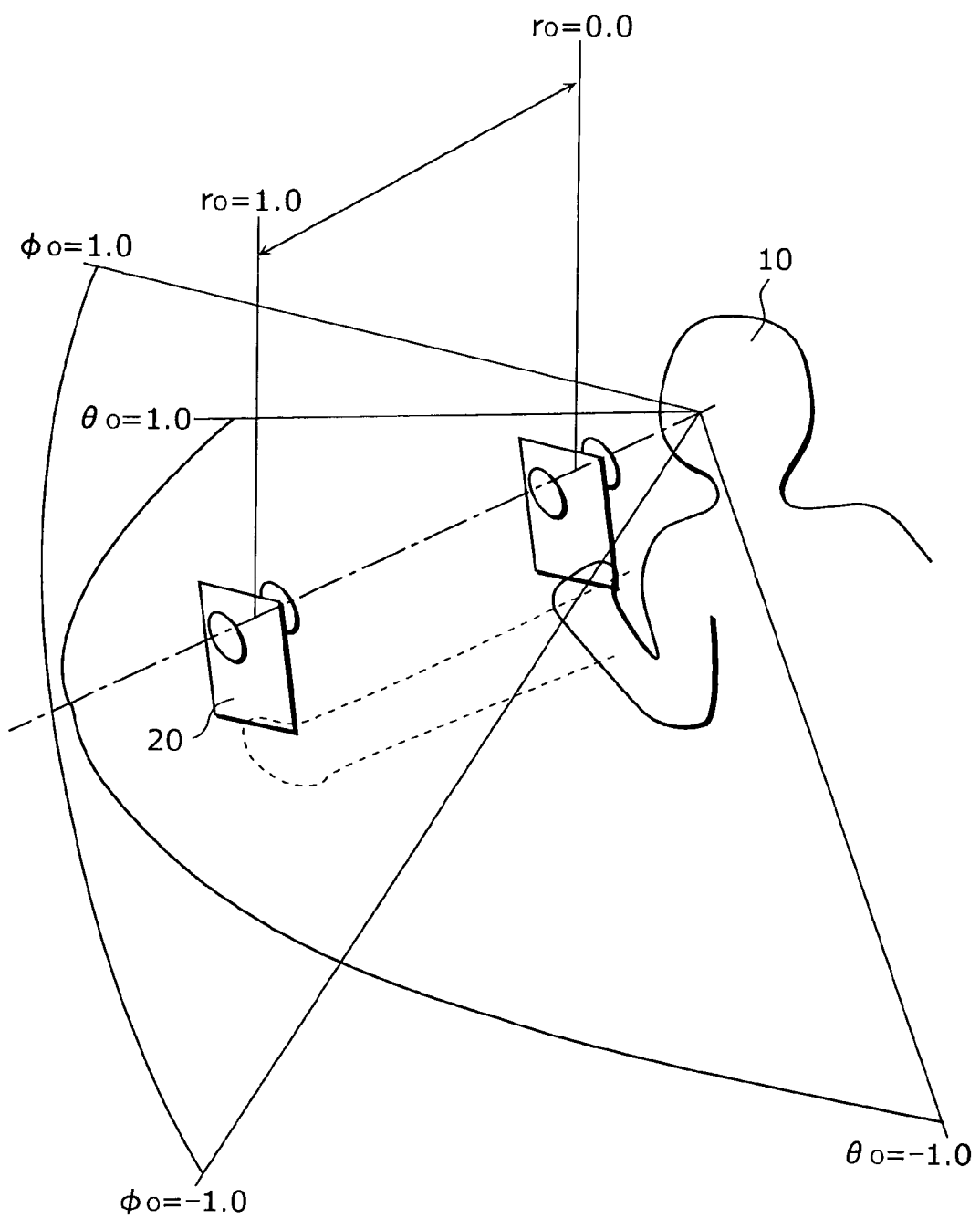
FIG. 2 is a schematic diagram showing the positions of the user and the cellular phone represented by relative coordinates in a state of FIG. 1.

FIG. 2 is a schematic diagram showing the positions of the user 10 and the cellular phone 20 represented by relative coordinates. As shown in FIG. 2, the closest position of the cellular phone 20 to the user at which the user can at least read the screen is assumed to be distance ro=0.0, and the farthest position when the user's arm is fully extended is assumed to be distance ro=1.0. In addition, within the range where the user 10 swings, from side to side, the arm which holds the cellular phone 20, the far-right position is assumed to be θo=1.0, the far-left position is assumed to be θo=−1.0, and a direction to the position coordinate normal line NL is assumed to be θo=0.0. Likewise, within the range where the user 10 swings, up and down, the arm which holds the cellular phone 20, the highest position is assumed to be φo=1.0, the lowest position is assumed to be φo=−1.0, and a direction to the position coordinate normal line NL is assumed to be φo=0.0.

Note that the definition of the aforementioned position coordinates is one of the examples, and the present invention does not limit the definition method of the position coordinates.

Figure 3:
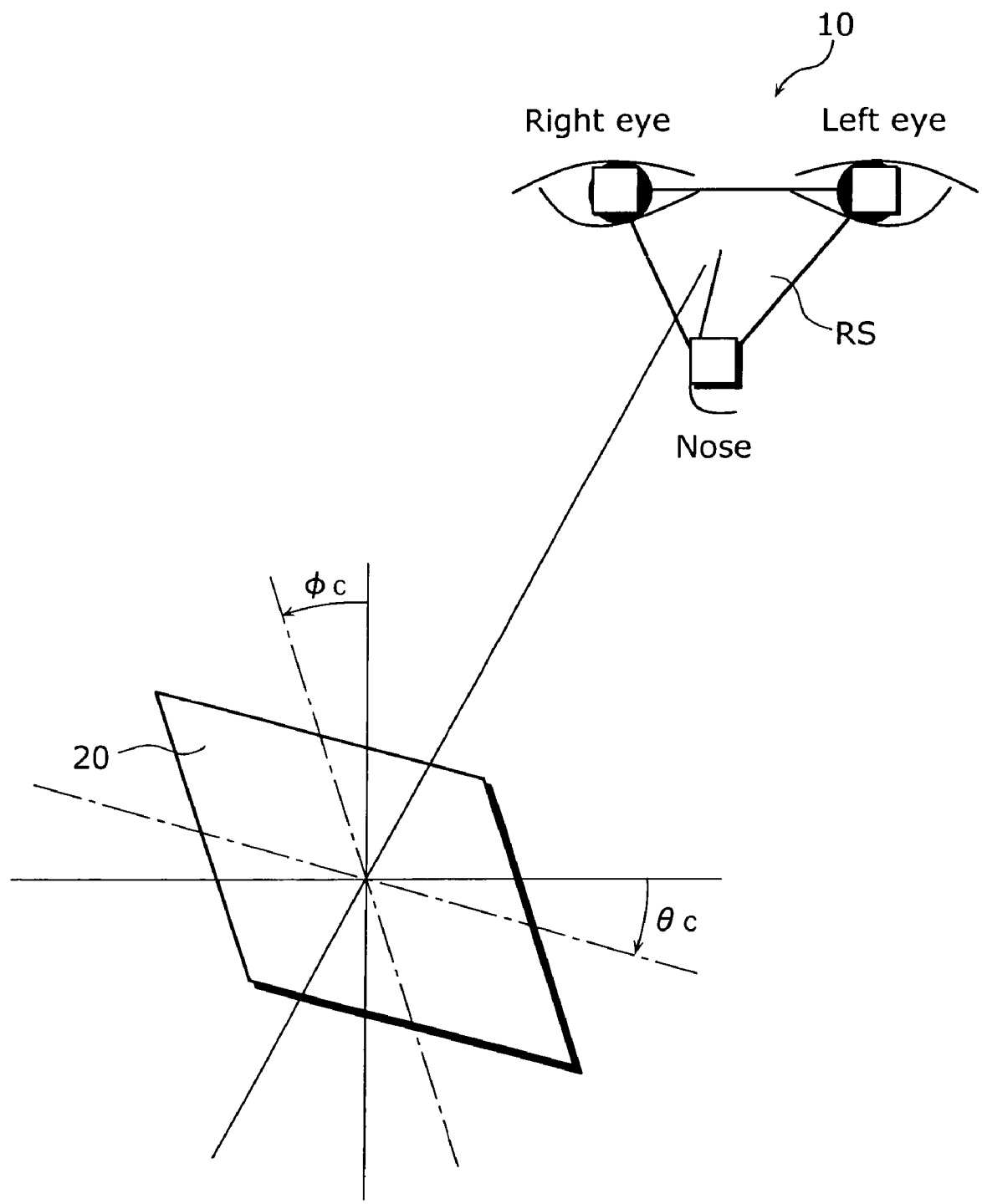
FIG. 3 is a schematic diagram showing representation of orientations of an apparatus.

FIG. 3 is a schematic diagram showing representation of orientations of the cellular phone 20. As shown in FIG. 3, an orientation of the cellular phone 20 (showed with a frame format in FIG. 3) is indicated by an angle horizontal to a reference plane and an angle vertical to the reference plane. The reference plane can be arbitrarily designated, and in FIG. 3, a plane RS is the reference plane which is determined by the positions of the both eyes and the nose of the user 10 which are captured at an initial state. The orientation of the cellular phone 20 in FIG. 3 is indicated by an angle θc which is an angle to the horizontal direction with respect to the reference plane RS and an angle φc which is an angle to the vertical direction with respect to the reference plane RS. Note that the rotation center is not limited to the point between the both eyes, and it has only to be designated in the vicinity of the rotation center of the user 10.

Figure 4:
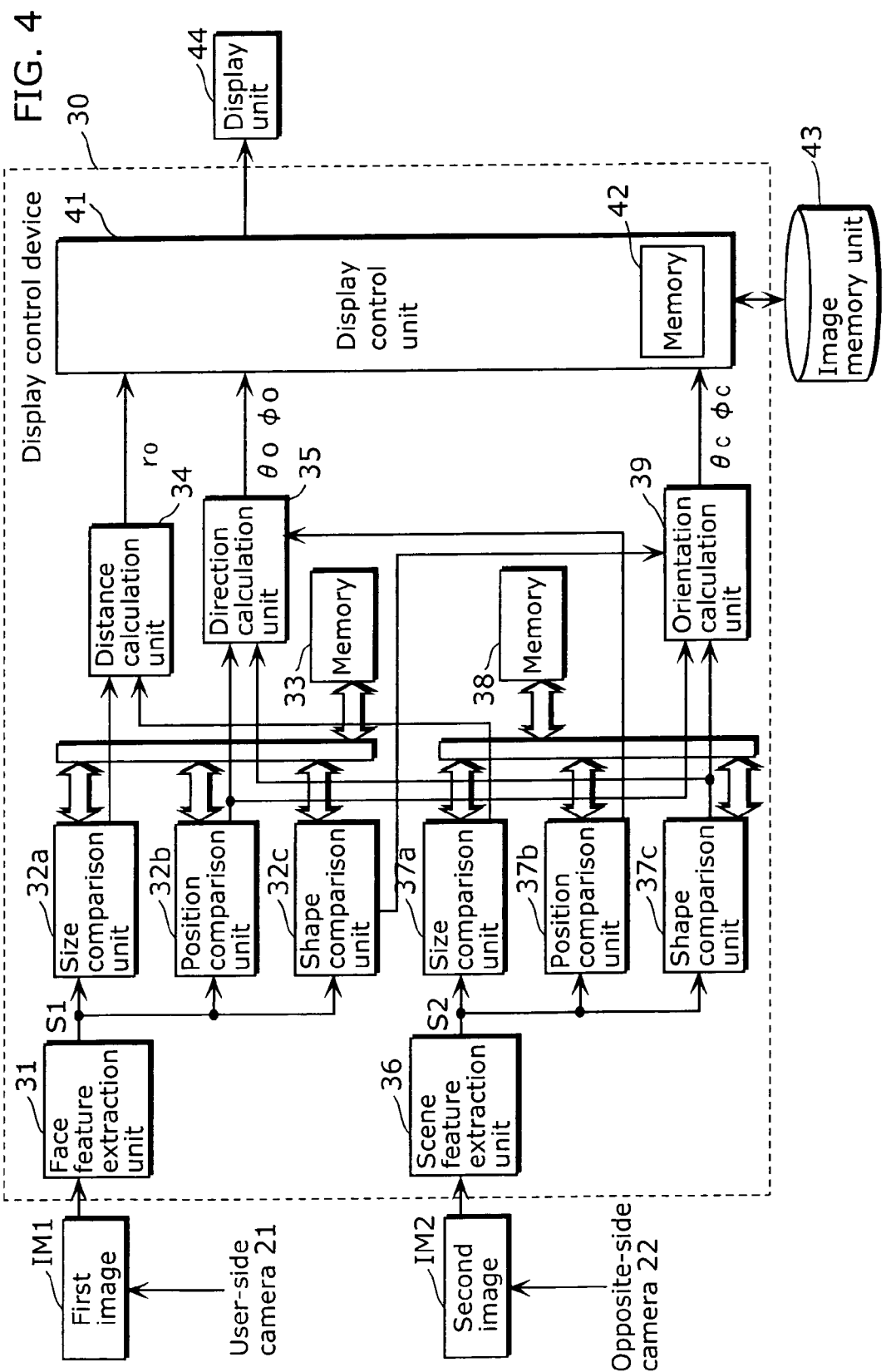
FIG. 4 is a block diagram showing the configuration of the display control device according to the embodiment of the present invention.

FIG. 4 is a block diagram showing the configuration of the display control device according to the embodiment. The display control device 30 in FIG. 4 calculates a position (ro, θo, φo) and an orientation (θc, φc) of the cellular phone 20 based on a first image IM1 that is an image captured by the user-side camera 21 and a second image IM2 that is an image captured by the opposite-side camera 22, and controls a display of the displayed image. As shown in FIG. 4, the display control device 30 is configured of a face feature extraction unit 31, a size comparison unit 32a, a position comparison unit 32b, a shape comparison unit 32c, memory 33, a distance calculation unit 34, a direction calculation unit 35, a scene feature extraction unit 36, a size comparison unit 37a, a position comparison unit 37b, a shape comparison unit 37c, memory 38, an orientation calculation unit 39 and a display control unit 41. Note that the first calculation unit includes the size comparison unit 32a, memory 33 and distance calculation unit 34, and the second calculation unit includes the position comparison unit 37b, shape comparison unit 37c, memory 38 and direction calculation unit 35.

The face feature extraction unit 31 as the first feature extraction unit extracts face feature points from the first image IM1 with a center focus on face parts, such as the eyes, nose, and mouth, and outputs each of face feature signals S1. The face feature signals S1 are supplied to the size comparison unit 32a, position comparison unit 32b and shape comparison unit 32c respectively. In the memory 33, the face feature points extracted in advance are accumulated as reference graphics. The scene feature extraction unit 36 as the second feature extraction unit extracts scene feature points from the second image IM2, and outputs each of scene feature signals S2. The scene feature signals S2 are supplied to the size comparison unit 37a, position comparison unit 37b and shape comparison unit 37c respectively. In the memory 38, the feature points extracted from the captured past images and information of marker graphics are stored.

The size comparison unit 32a compares the size of an image feature (marker graphics) obtained from the face feature signal S1 to the size of the reference graphics accumulated in the memory 33. The distance calculation unit 34 calculates the distance ro from the comparison result obtained by the size comparison unit 32a.

Figure 5:
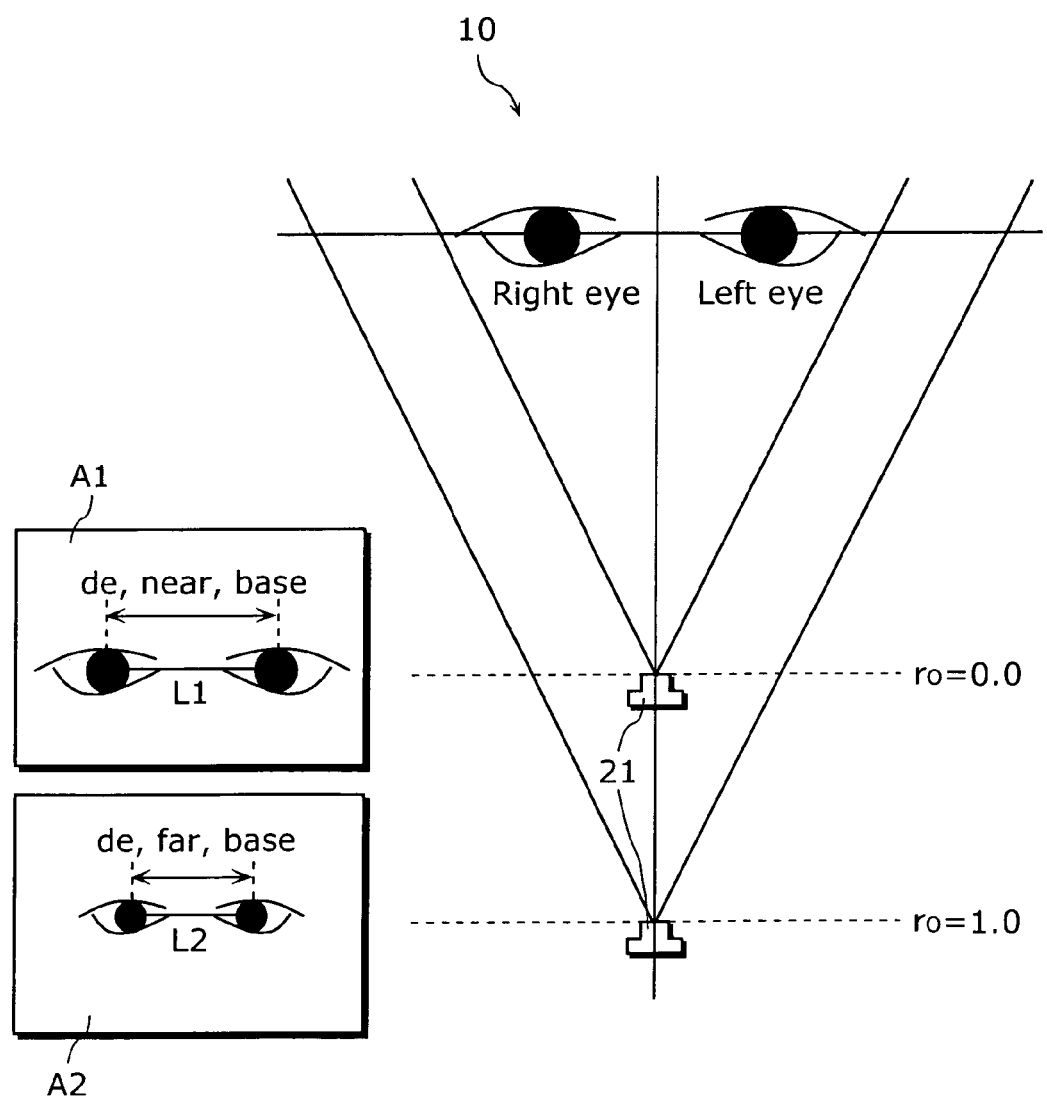
FIG. 5 is a diagram describing an example of a method for detecting a distance to the apparatus.

FIG. 5 is a diagram describing an example of a method for obtaining the distance ro. In the example of FIG. 5, a face feature point is designated between the pupils, and line segments which connect respective center of the pupils are designated as the marker graphics. In the memory 33, a line segment L1 which connects the center of the pupils obtained from an image A1 captured in a position where the distance ro=0.0, and a line segment L2 which connects the center of the pupils obtained from an image A2 captured in a position where the distance ro=1.0 are stored in advance as the reference marker graphics. The length of the line segment L1 is expressed by (de, near, base), and the length of the line segment L2 is expressed by (de, far, base). Here, in the case where the length of the line segment (pupil distance) which connects the center of the pupils obtained from the face feature point signal S1 is assumed to be de, the distance ro is obtained by the following equation.

$$ro=(de,near,base-de)/(de,near,base-de,far,base)$$

As the image IM1 captured by the user-side camera 21 constantly includes the face of the user 10, it can be expected that such a method which designates a line segment which connects center of the pupils as marker graphics performs stable detection, compared to the extraction of marker graphics from an arbitrarily captured scene.

Although the marker graphics in the two positions where ro=0.0, 1.0 are used as initial data, the method for providing the initial data and calculating the distance ro is not limited to the aforementioned method. For example, it may be possible to detect the pupils when initializing the system after the turning-on of the power to the cellular phone, calculate the scaling of the pupil distance with respect to the distance between the pupils, and utilize the calculated scaling as the scaling of the distance ro.

In addition, although a line segment which connects the center of the pupils is used as marker graphics and the length of the line segment is used as the size of the marker graphics here, various kinds, sizes, or the number of the marker graphics and various size definitions of such marker graphics can be conceived instead.

Figure 6:
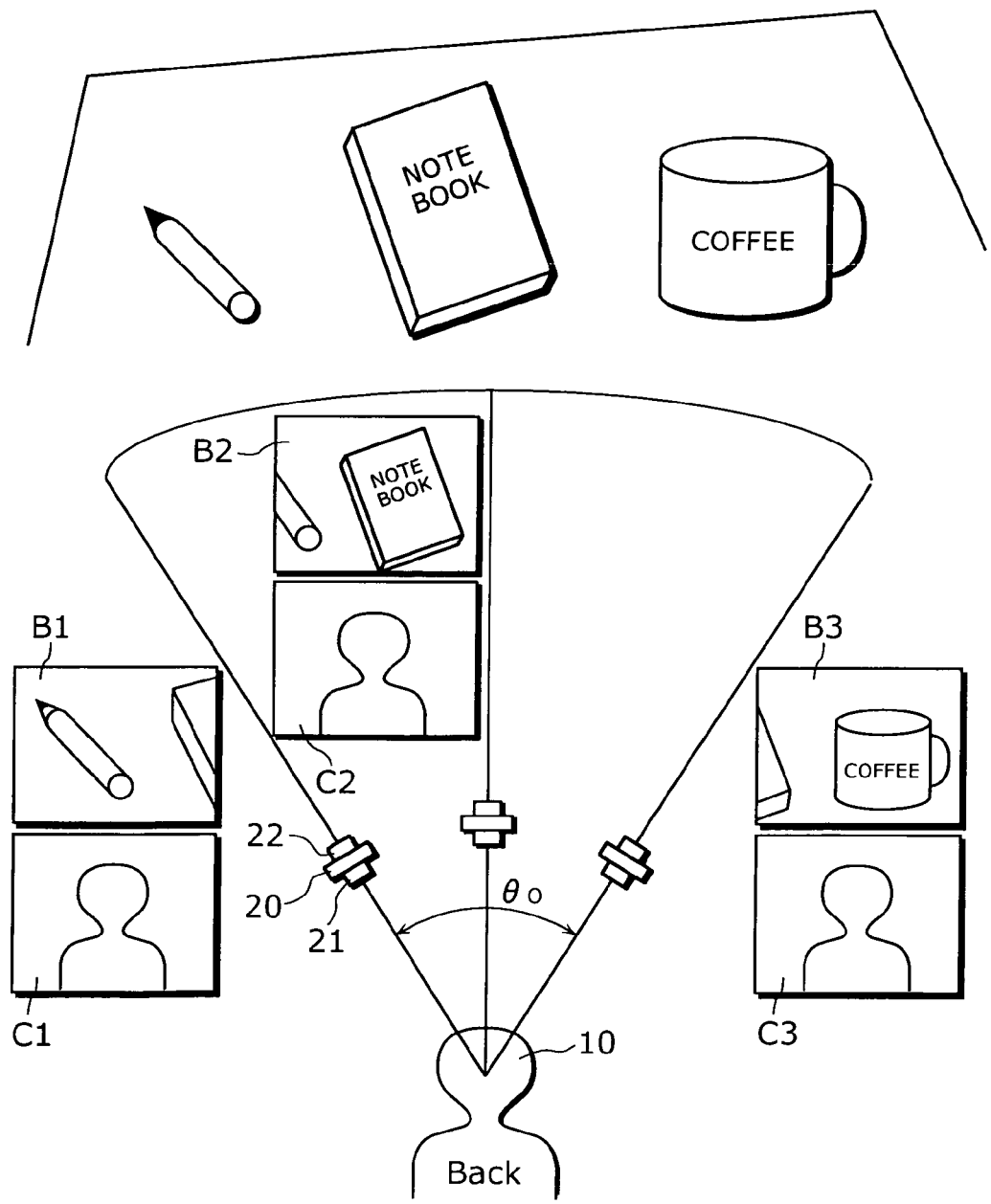
FIG. 6 is a diagram describing an example of a method for detecting a direction of the apparatus.

On the other hand, the effective way to detect a direction to the cellular phone 20, in other words, the angles θo and φo is to operate the user-side camera 21 and opposite-side camera 22 in a coordinated manner. In FIG. 6, an image captured by the user-side camera 21 and opposite-side camera 22 is shown in the case where the cellular phone 20 is moved to the horizontal direction (angle θo). In FIG. 6, a pencil, a notebook and a mug are put on a table in front of the user 10.

In other words, as the user-side camera 21 constantly captures the user 10 which is the rotation center, even in the case where the cellular phone 20 is moved to the horizontal direction, it is possible to obtain almost the same images captured by the user-side camera 21 (images C1, C2, and C3). The images C1 to C3 do not become completely the same image, because the cellular phone is moved by the hand and such motion differs from a mechanical rotation by a robot arm. Therefore, the respective positions of the marker graphics are tentatively different each other. However, as the difference between the marker graphics is not so large, the resolution becomes low when the angle θo is detected from the images C1 to C3.

On the other hand, as the opposite-side camera 22 captures a scene opposite to the user 10, the obtained image largely varies depending on the motions of the cellular phone 20, as shown in images B1, B2, and B3. Here, it is assumed that the feature points are extracted from the image B2 using brightness differences and the like in an edge of the notebook and/or pencil so as to start the detection of the angle θo. Then, in the case where the user 10 moves the cellular phone 20 to the left hand side, a part of the notebook disappears from the image and the whole image of the pencil is displayed, as shown in the image B1. Conversely, in the case where the user 10 moves the cellular phone 20 to the right hand side, as shown in the image B3, the mug appears in the image. Then, tracking of plural feature points are executed in parallel, in accordance with the movement of the opposite-side camera 22. With this, even when a part of the feature points disappears from the image, it is possible to detect the angle θo from other feature points. In addition, when a new feature point is detected by the object which appears in the image, it is added as a target for tracking feature points. In this manner, by tracking the feature points in the image captured by the opposite-side camera 22, in other words, by comparing the image features extracted from the second image IM2 to the image features extracted from the past images, it is possible to detect the angle θo with high resolution. Note that as an object captured by the opposite-side camera 22 is arbitrary, the stability of the feature detection is inferior to the detection by the user-side camera 21 which constantly captures face images.

In other words, as the user-side camera 21 constantly captures the face of the user 10, the detection of the marker is stable. However, as the amount of movement is small, the method is not suitable for detecting the angle θo in details. On the other hand, as the image captured by the opposite-side camera 22 largely varies, the amount of movement of the feature points is large and the angle θo can be calculated in details. However, as the captured scenes are arbitrary, there are possibilities that the precision with which to detect the marker becomes unstable.

In this manner, as the user-side camera 21 and opposite-side camera 22 have both merits and demerits in detection of the angle θo respectively, it is possible to improve the detection with precision by complementing the operations each other. For example, when the detection of the feature points from the image ends in failure and until the opposite-side camera 22 recovers the detection of the feature points, the image captured by the user-side camera 21 may be used for detecting the angle θo.

In addition, for example, the mean values of the angle θo calculated respectively from the images captured by the user-side camera 21 and the opposite-side camera 22 may be used. In addition, for example, among the angles θo calculated respectively from the images captured by the user-side camera 21 and the opposite-side camera 22, unique values may be excluded for the use, judging from the past history, a predetermined threshold value or the like.

The rotation angle $\phi o$ to the vertical direction can also be detected likewise the rotation angle $\theta o$ to the horizontal direction. Since the image of the user-side camera 21 largely varies compared to motion to the horizontal direction, it is considered that the detection precision is slightly improved. Note that the merit-demerit relationship between the user-side camera 21 and the opposite-side camera 22 is the same as the one in which the direction is changed to the horizontal direction. Therefore, in order to improve the position detection precision, cooperative processing through complementary operations using images captured by two cameras becomes effective.

In other words, the direction calculation unit 35 calculates the angle $\theta o$, $\phi o$, that is, the direction of the cellular phone 20 using the comparison results by the position comparison unit 32b and the position comparison unit 37b.

The cooperative processing through captured images by two cameras is also effective at detecting the distance ro. In other words, it is possible to obtain the distance ro from the second image IM2 using the size variations of the marker graphics. It is probable that the detection becomes unstable because the marker graphics are extracted from arbitrary scenes. However, as there are possibilities that the marker extraction from the first image IM1 may end in failure due to some reasons, the distance detection from the second image IM2 is effective as the backup.

Figure 7:
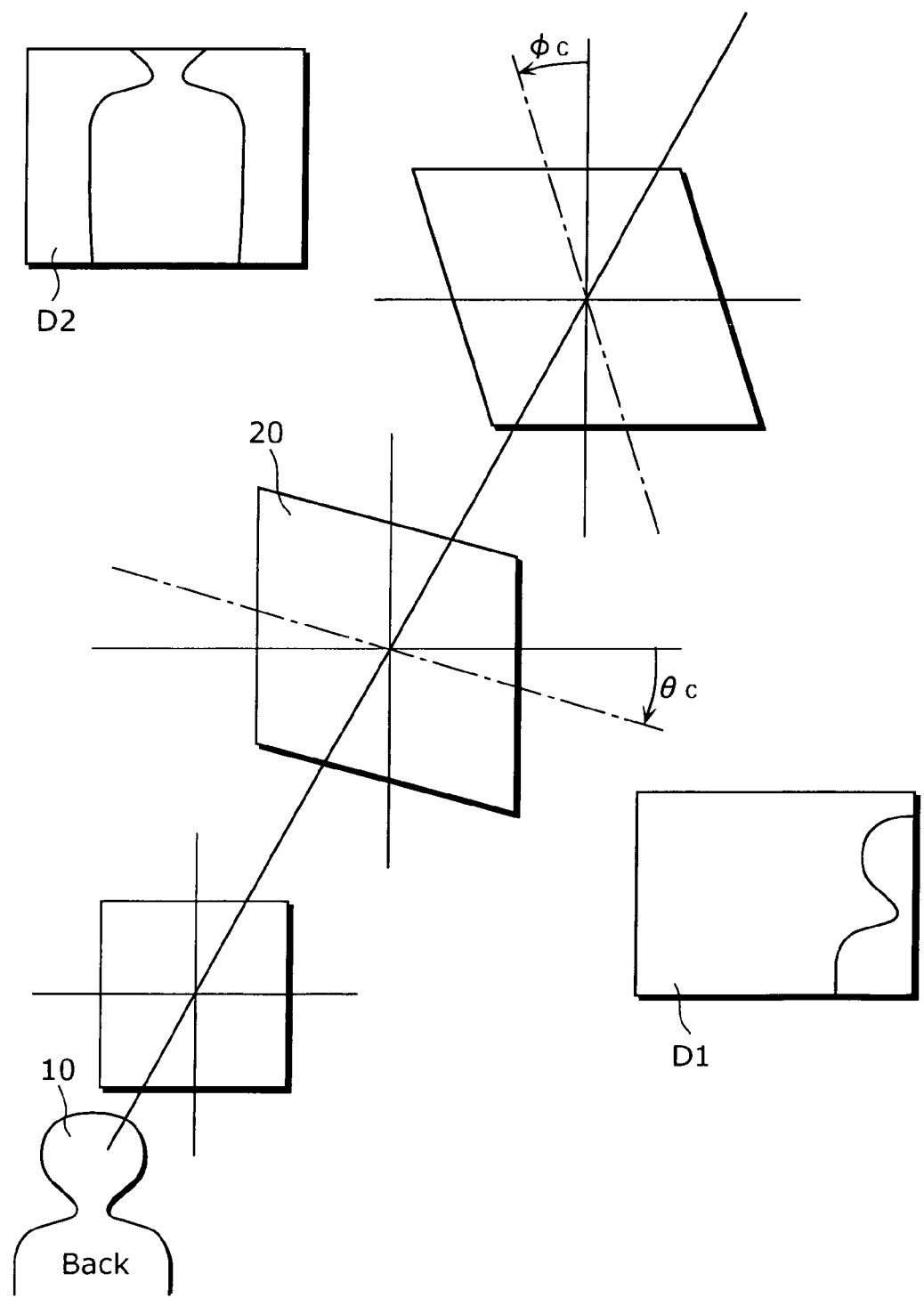
FIG. 7 is a diagram describing an example of a method for detecting an orientation of the apparatus.

In addition, the orientation of the cellular phone 20 can be detected by the position comparison or the shape comparison of the marker graphics. FIG. 7 shows an image captured by the user-side camera 21 when the orientation of the cellular phone 20 is changed. In FIG. 7, an image D1 is an image when the cellular phone 20 is rotated by the angle $\theta c$ to the horizontal direction. In the image D1, the user 10 is displaced to the lateral direction (right side in this example). The image D2 is an image when the cellular phone 20 is rotated by the angle $\phi c$ to the vertical direction. In the image D2, the user 10 is displaced to the longitudinal direction (up in this example).

Thus, it is possible to detect an orientation of the cellular phone 20 by obtaining the amount of displacement of the marker graphics position (for example, the edge of the shoulder). In addition, by focusing attention on the shape of the marker graphics, the graphics become flat with the variations of the orientation, and for example, a circle is changed to an oval. Thus, it is possible to detect the orientation of the cellular phone 20 from variations of the shape of the marker graphics. Likewise, it is possible to detect the orientation of the cellular phone 20 from an image captured by the opposite-side camera 22.

In other words, the orientation calculation unit 39 calculates the angles $\theta c$, $\phi c$, that is, the orientation of the cellular phone 20 using the comparison results by the position comparison unit 32b and shape comparison unit 32c and the comparison results by the position comparison unit 37b and shape comparison unit 37c.

Note that there is a case where using, as a marker, lighting in a background of the face of the user 10 is effective when performing the detection from the first image IM1 captured by the user-side camera 21. In such a case, the marker graphics may be extracted by giving the first image IM1 to the scene feature point extraction unit 36.

The display control unit 41 displays, on a display unit 44, an image stored in an image memory unit 43 selected by the user 10. In addition, the display control unit 41 controls a display of the image (displayed image) displayed on the display unit 44 based on the distance ro calculated by the distance calculation unit 34, the angles $\theta o$, $\phi o$ calculated by the direction calculation unit 35, and the angles $\theta c$, $\phi c$ calculated by the orientation calculation unit 39. Note that in the image memory unit 43, plural images captured from different directions and having different sizes are stored in advance.

Figure 8:
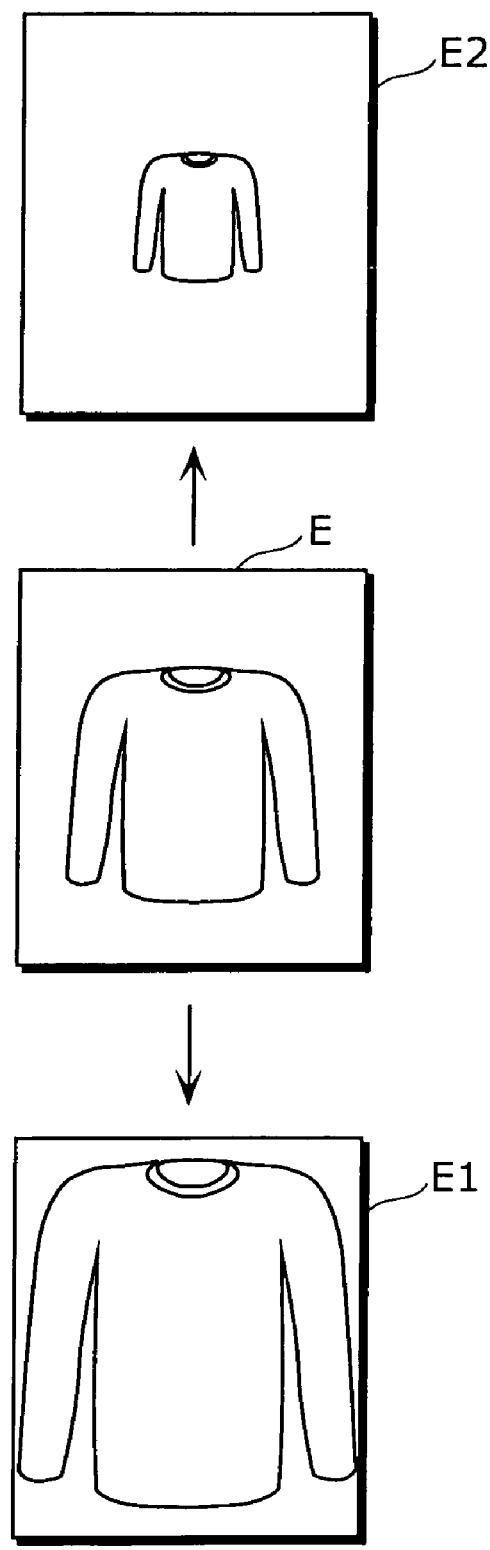
FIG. 8 is a diagram describing the control of an enlargement display or a reduction display.

FIG. 8 is a diagram describing the control of enlargement or reduction display. Here, a display image E is initially displayed on the display unit 44. The display control unit 41 performs control of displaying the display image E shown in FIG. 8 by enlarging or reducing the image in accordance with the distance ro calculated by the distance calculation unit 34. In other words, for example, when the cellular phone 20 is moved by the user 10 and as a result, the distance ro becomes shorter, the display control unit 41 controls the display by enlarging the image so as to display the enlarged image as a display image E1 shown in FIG. 8. On the other hand, for example, when the distance ro becomes longer, the display control unit 41 controls the display by reducing the image so as to display the reduced image as a display image E2 shown in FIG. 8. In addition, the display control unit 41 controls, with the angles $\theta c$, $\phi c$ calculated by the orientation calculation unit 39, a center position in the case where the display image E is enlarged or reduced.

Figure 9:
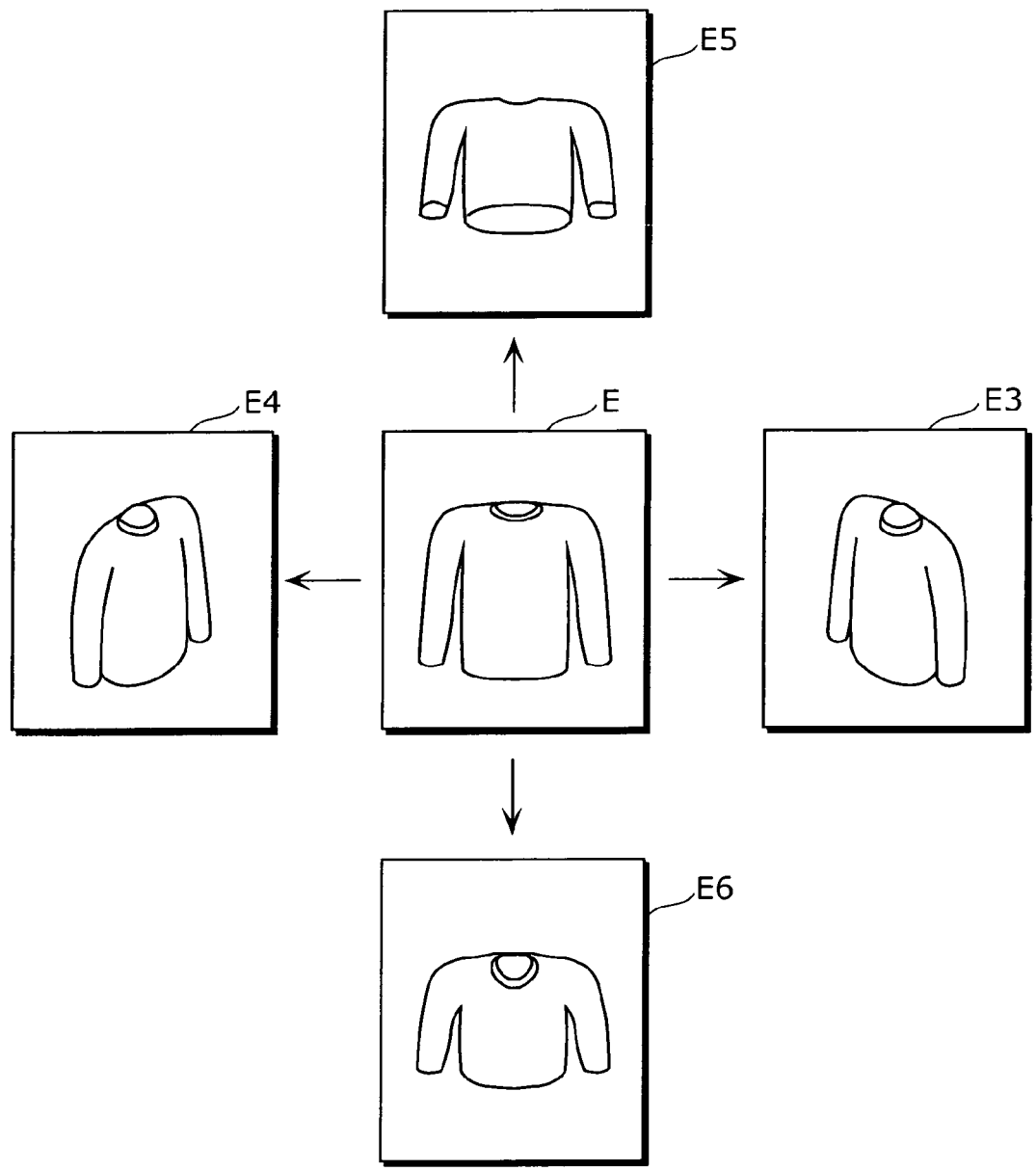
FIG. 9 is a diagram describing the control of a modified display to the displayed direction.

FIG. 9 is a diagram describing the control of a modified display to a displayed direction. Here, the display image E is initially displayed on the display unit 44. The display control unit 41 performs control of a display by changing the displayed direction of the display image E shown in FIG. 9 in accordance with the angles $\theta o$, $\phi o$ calculated by the direction calculation unit 35. In other words, for example, when the cellular phone 20 is moved by the user 10 and is moved to the right direction (the angle $\theta o$ is in a positive direction), the display control unit 41 controls the display of the image viewed from the right direction as a display image E3 shown in FIG. 9. On the other hand, when the cellular phone 20 is moved to the left direction (the angle $\theta o$ is in a negative direction), the display control unit 41 controls the display of the image viewed from the left direction as a display image E4 shown in FIG. 9. In addition, for example, when the cellular phone 20 is moved upward (the angle $\phi o$ is a positive direction), the display control unit 41 controls the display of the image viewed from below as a display image E5 shown in FIG. 9. On the other hand, when the cellular phone 20 is moved below (the angle $\phi o$ is a negative direction), the display control unit 41 controls the display of the image viewed from above as a display image E6 shown in FIG. 9.

As described above, the cellular phone 20 is moved from the initial position by the user 10, and the display control unit 41 controls the display of the displayed image in accordance with the amount of movement from the initial position (relative value). However, the present invention is not limited to such control. For example, the display control unit 41 may control the displayed image in accordance with the distance ro calculated by the distance calculation unit 34, the values of the angles $\theta o$, $\phi o$ (absolute values) calculated by the direction calculation unit 35, and the values of the angles $\theta c$, $\phi c$ (absolute value) calculated by the orientation calculation unit 39.

In addition, the display control unit 41 displays, on the display unit 44, an image stored in the image memory unit 43. The image is not limited to the image stored in the image memory unit 43 provided in the cellular phone 20. For example, the display control unit 41 may control display of an image obtained via networks, such as the Internet, for example an image in on-line shopping.

In addition, when the display control unit 41 controls display of a display image, it may control the display of a displayed image by storing a single image in the memory 42 and perform image processing on this image without using plural images respectively captured from different directions and having different sizes.

Figure 10:
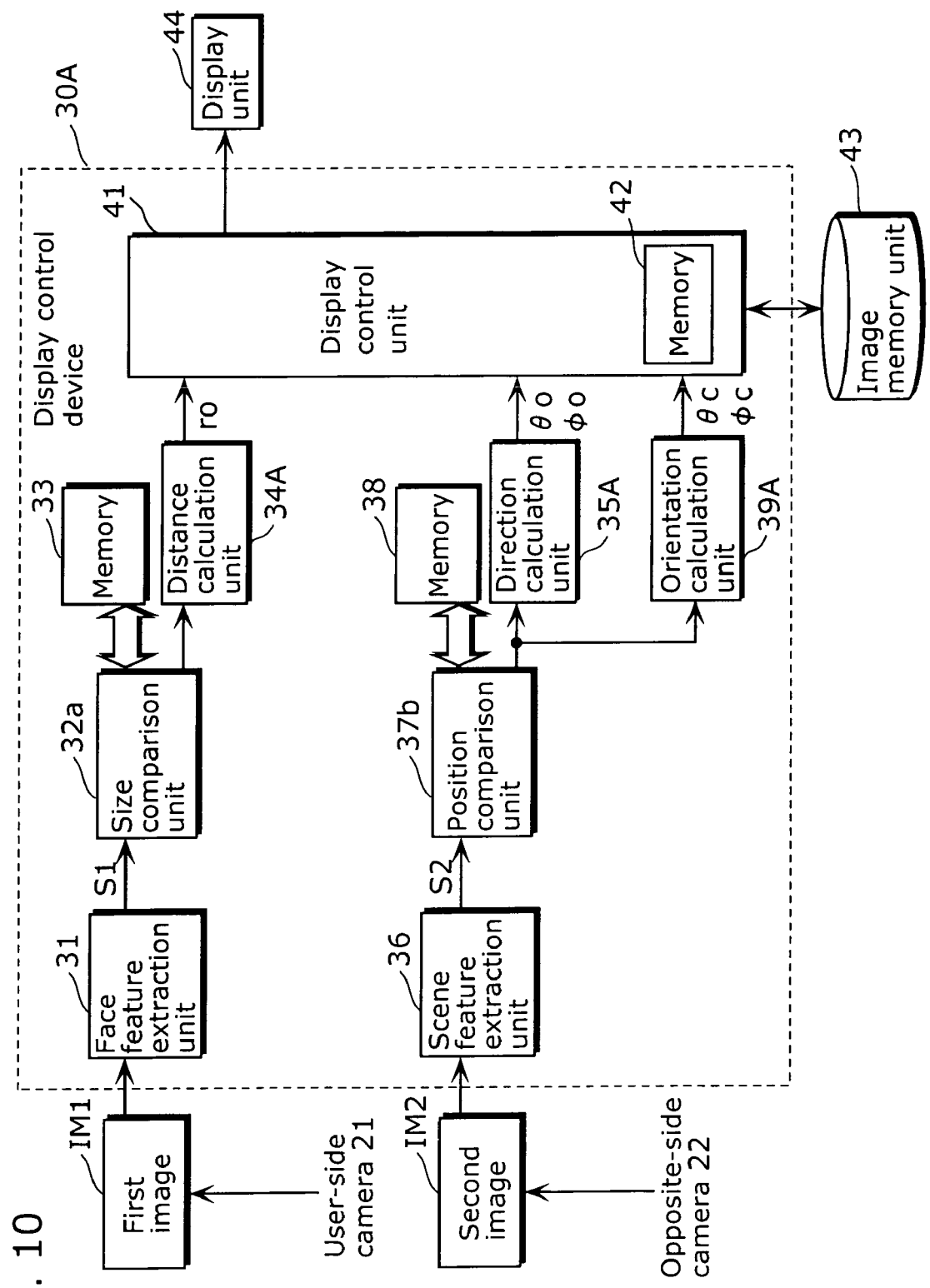
FIGS. 10 and 11 are variations of the configuration shown in FIG. 4.

FIG. 10 is a block diagram showing configuration other than the position/orientation detection circuit. In order to describe a position of the cellular phone 20 in the rotating coordinate system in which the user 10 is a rotation center, as described in FIG. 6, using the second image IM2 captured by the opposite-side camera 22 is preferable for detecting the direction of the cellular phone 20. From these viewpoints, the circuit scale of the configuration in FIG. 10 is largely reduced compared to the configuration shown in FIG. 4.

In other words, in the position/orientation detection circuit 30A of FIG. 10, the position comparison unit 37b and direction calculation unit 35A detect the angles θo, φo from the second image IM2 captured by the opposite-side camera 22. In addition, as the position comparison unit 37b calculates differences between the positions of the marker graphics, the orientation calculation unit 39A detects the orientations θc, φc based on the resulting calculation. On the other hand, as the marker extraction from face images is stable, the distance ro is detected using the first image IM1 captured by the user-side camera 21.

Figure 11:
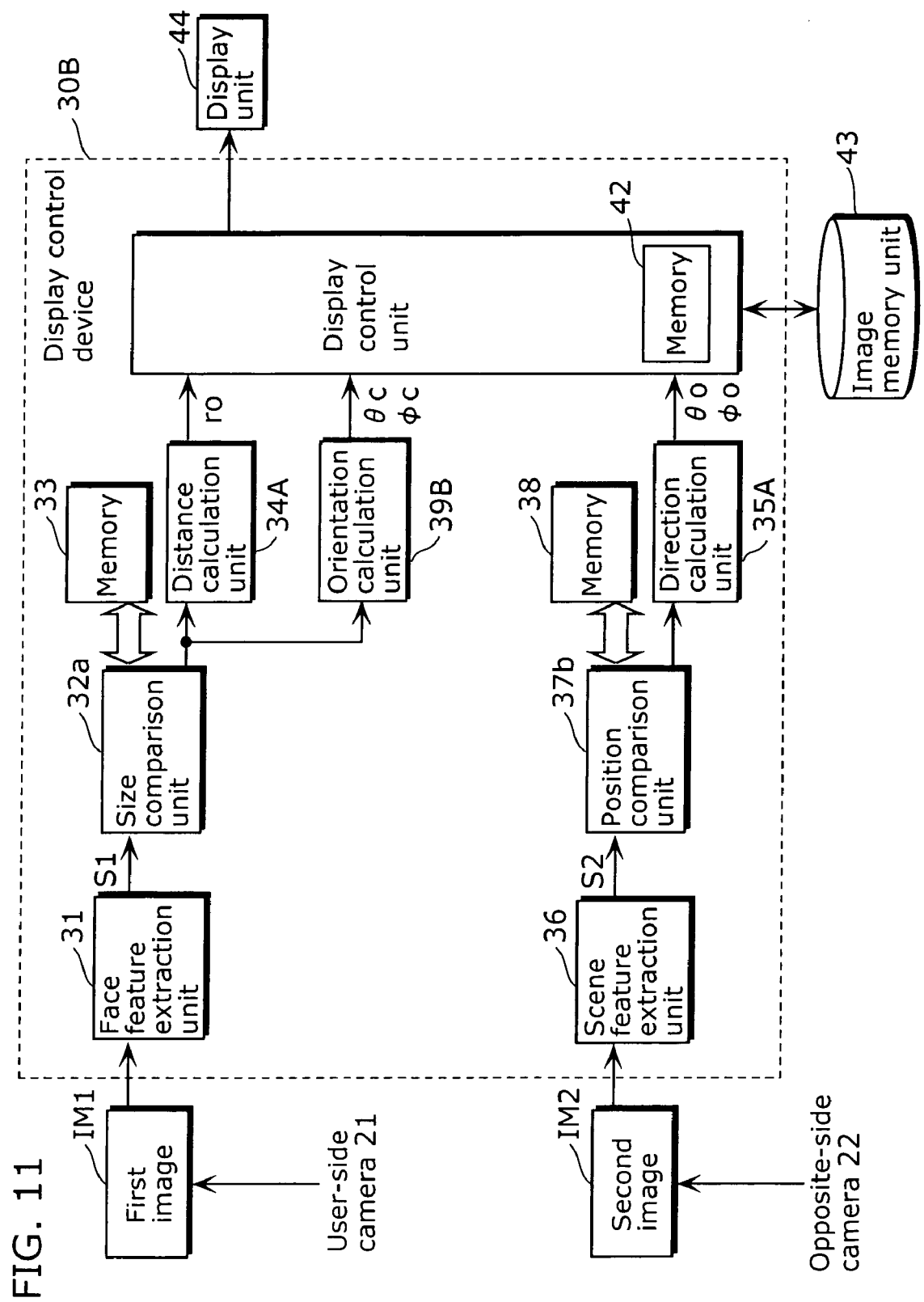

FIG. 11 is also a block diagram showing configuration other than the position/orientation detection circuit. The marker as a key for detection can detect a particular object with precision rather than an arbitrary subject. Therefore, the circuit scale in the configuration of FIG. 11 is largely reduced compared to the configuration shown in FIG. 4 by prioritizing the processing which extracts a marker from a face image.

In other words, in the position/orientation detection circuit 30B of FIG. 11, the position comparison unit 37b and direction calculation unit 35A execute the detection of the angles θo, φo from the second image IM2 captured by the opposite-side camera 22. On the other hand, the distance ro and orientations θc, φc are detected by the first image IM1 captured by the user-side camera 21, and a face image is detected as the marker graphics by the size comparison unit 32a, distance calculation unit 34A and orientation calculation unit 39B.

Although the case where the user 10 moves the cellular phone 20 by the hand is described in the present embodiment, the method of moving apparatuses is arbitrary, and the method in the present invention is not limited to such.

In addition, precisely speaking, positions of the two cameras are different. However, as such cameras are normally small in size, the difference can be ignored. Even when it can not be ignored, the position may be corrected by making conversions of the geometric positions of the two cameras, and there may be a case when the mean values of the two camera positions can be applied.

In the present embodiment, the optical axis of the user-side camera 21 matches that of the opposite-side camera 22. When the optical axis is matched, the two cameras 21 and 22 geometrically have the easiest positional relationship. In other words, this is an idea for making the geometric conversions between the two cameras 21 and 22 simpler. Note that the optical axes of the two cameras do not have to be matched, and as long as the geometric relationship is known, the two cameras may have an arbitrary positional relationship.

In addition, although the present embodiment uses two cameras, for example, a single wide angle camera may capture an image covering a wider area. In other words, among two captured images, one of them has only to include a known object as image features.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

As the present invention can be realized by a simple structure having two cameras, it is possible to introduce it to portable apparatuses with ease. By sequentially displaying, on a display, images in accordance with a position and an orientation of the apparatus, even in the case where the display area is small, the user can watch, through the display, the whole subject and observe the subject with more reality as if he/she touched it. For example, with this, it is possible to substantially improve practical utility of on-line shopping. In addition, the present invention can be applied to medical use for which an image captured on a spot and computer graphics can be combined and to use in museums, such as digital archives.

What is claimed is:

1. A display control method for controlling a display of a displayed image based on a position of an apparatus provided with a first camera and a second camera which are in a known geometric relationship, said display control method comprising:

capturing, by the first camera, a first image including an object with a known image feature;

capturing, by the second camera, a second image including a scene in the vicinity of the object;

extracting the image feature of the object from the first image;

calculating a distance from the object to the apparatus and a direction of the apparatus viewed from the object, by comparing the extracted image feature of the object to the known image feature of the object;

extracting an image feature of the second image from the second image;

calculating a distance from the object to the apparatus and a direction of the apparatus viewed from the object, by comparing the extracted image feature of the second image to an image feature extracted from a past image which has been captured by the second camera; and controlling the display of the displayed image based on the distance and direction calculated based on the first image and the distance and direction calculated based on the second image.

2. The display control method according to claim 1, wherein the object is a face of a user who uses the apparatus.

3. The display control method according to claim 1, wherein said controlling of the display of the displayed image includes calculating the distance from the object to the apparatus and the direction viewed from the object using, in a complementary manner, the distance and direction calculated based on the first image and the distance and direction calculated based on the second image, and controlling the display of the displayed image based on the calculated distance and direction.

4. The display control method according to claim 3, wherein said controlling of the display of the displayed image includes controlling the display of the displayed image based on the distance and direction calculated based on the first image in the case where the image feature of the second image can not be extracted and until the image feature of the second image can be extracted.

5. The display control method according to claim 1, further comprising calculating an orientation of the apparatus with respect to the object using at least one of the image feature of the object extracted from the first image and the image feature of the second image extracted from the second image, wherein controlling the display of the displayed image includes controlling the display of the displayed image based on the calculated distance from the object to the apparatus, the calculated direction of the apparatus, and the calculated orientation of the apparatus.

6. A display control device for controlling a display of a displayed image based on a position of an apparatus provided with a first camera and a second camera which are in a known geometric relationship, said display control device comprising:

a first feature extraction unit operable to extract an image feature of an object from a first image including a known image feature of the object, the first image being captured by said first camera;

a first calculation unit operable to calculate a distance from the object to said apparatus and a direction of said apparatus viewed from the object, by comparing, to the known image feature of the object, the image feature of the object extracted by said first feature extraction unit;

a second feature extraction unit operable to extract an image feature of a second image from the second image including a scene in the vicinity of the object, the second image being captured by said second camera;

a second calculation unit operable to calculate a distance from the object to said apparatus and a direction of said apparatus which is viewed from the object, by comparing the image feature of the second image extracted by said second feature extraction unit to an image feature extracted from a past image which has been captured by said second camera; and a display control unit operable to control the display of the displayed image based on the distance and direction calculated by said first calculation unit, and the distance and direction calculated by said second calculation unit.

7. A portable apparatus provided with a first camera and a second camera which are in a known geometric relationship, said portable apparatus comprising a display control device operable to control a display of a displayed image based on a position of said portable apparatus, said display control device including:

a first feature extraction unit operable to extract an image feature of an object from a first image including a known image feature of the object, the first image being captured by said first camera;

a first calculation unit operable to calculate a distance from the object to said apparatus and a direction of said apparatus viewed from the object, by comparing, to the known image feature of the object, the image feature of the object extracted by said first feature extraction unit;

a second feature extraction unit operable to extract an image feature of a second image from the second image including a scene in the vicinity of the object, the second image being captured by said second camera;

a second calculation unit operable to calculate a distance from the object to said apparatus and a direction of said apparatus which is viewed from the object, by comparing the image feature of the second image extracted by said second feature extraction unit to an image feature extracted from a past image which has been captured by said second camera; and a display control unit operable to control the display of the displayed image based on the distance and direction calculated by said first calculation unit, and the distance and direction calculated by said second calculation unit, wherein said display control device is operable to control the display of the displayed image based on a position of said portable apparatus.

8. A program for controlling a display of a displayed image based on a position of an apparatus provided with a first camera and a second camera which are in a known geometric relationship, said program being recorded on a recording medium and causing a computer to execute a method comprising:

extracting an image feature of an object from a first image including a known image feature of the object, the first image being captured by the first camera;

calculating a distance from the object to the apparatus and a direction of the apparatus which is viewed from the object, by comparing the extracted image feature of the object to the known image feature of the object;

extracting an image feature of a second image from the second image including a scene in the vicinity of the object, the second image being captured by the second camera;

calculating a distance from the object to the apparatus and a direction of the apparatus viewed from the object, by comparing the extracted image feature of the second image to an image feature extracted from a past image which has been captured by the second camera; and controlling the display of the displayed image based on the distance and direction calculated by the first image, and the distance and direction calculated by the second image.

* * * * *